(12) United States Patent
Tissot

(10) Patent No.: US 9,489,810 B2
(45) Date of Patent: Nov. 8, 2016

(54) HAPTIC FEEDBACK TOUCH-SENSITIVE INTERFACE MODULE

(75) Inventor: Jean-Marc Tissot, Viuz en Sallaz (FR)

(73) Assignee: DAV, Créteil (FR)

(*) Notice: Subject to any disclaimer, the term of this patent is extended or adjusted under 35 U.S.C. 154(b) by 266 days.

(21) Appl. No.: 13/880,467

(22) PCT Filed: Oct. 21, 2011

(86) PCT No.: PCT/FR2011/000567
§ 371 (c)(1),
(2), (4) Date: Jun. 18, 2013

(87) PCT Pub. No.: WO2012/052635
PCT Pub. Date: Apr. 26, 2012

(65) Prior Publication Data
US 2013/0257776 A1    Oct. 3, 2013

(30) Foreign Application Priority Data

Oct. 20, 2010  (FR) ...................................... 10 04115

(51) Int. Cl.
*G06F 3/041*  (2006.01)
*G06G 5/00*  (2006.01)
(Continued)

(52) U.S. Cl.
CPC  *G08B 6/00* (2013.01); *G05G 5/06* (2013.01); *G06F 3/016* (2013.01); *G06F 3/03547* (2013.01); *H02K 33/16* (2013.01); *H02K 7/14* (2013.01)

(58) Field of Classification Search
CPC ..... G05G 5/06; G06F 3/016; G06F 3/03547; G08B 6/00; H02K 33/16; H02K 7/14

USPC .................................................. 345/156, 173
See application file for complete search history.

(56) References Cited

U.S. PATENT DOCUMENTS 5,682,132 A   10/1997  Hiroyoshi et al.
6,001,014 A   12/1999  Ogata et al.
(Continued)

FOREIGN PATENT DOCUMENTS

| EP | 1310860 A1 | 5/2003 |
| EP | 1 429 299 A1 | 6/2004 |
| JP | 11-162277 A | 6/1999 |
| WO | 03/044929 A1 | 5/2003 |

OTHER PUBLICATIONS

International Search Report issued in PCT/FR2011/000567 mailed on Feb. 21, 2012 (3 pages).

*Primary Examiner* — Andrew Sasinowski
*Assistant Examiner* — Kuo Woo
(74) *Attorney, Agent, or Firm* — Osha Liang LLP

(57) ABSTRACT

The invention relates a haptic feedback touch-sensitive interface module (1) including a touch-sensitive surface (3), capable of detecting bearing by a user, and at least one actuator that is connected to the touch-sensitive surface (3), wherein said module is capable of generating haptic feedback on the basis of the bearing detected, and includes: a frame (11); a movable core (13) that engages with the frame (11) and is intended to be moved between extremal positions so as to generate the haptic feedback; and an electromagnetic actuation means (15, 17) for moving the movable core (13); wherein the actuator of said haptic feedback touch-sensitive interface module also comprises a first and second prestressed resilient means (19A and 19B), respectively arranged on either side of the movable core (13).

13 Claims, 3 Drawing Sheets

(51) Int. Cl.
  *G08B 6/00*     (2006.01)
  *G05G 5/06*     (2006.01)
  *G06F 3/01*     (2006.01)
  *G06F 3/0354*   (2013.01)
  *H02K 33/16*    (2006.01)
  *H02K 7/14*     (2006.01)

(56) References Cited

U.S. PATENT DOCUMENTS

2002/0149561 A1\* 10/2002 Fukumoto et al. ........... 345/156
2005/0184601 A1   8/2005 Kweon et al.
2006/0109256 A1\*  5/2006 Grant et al. ................. 345/173

\* cited by examiner

HAPTIC FEEDBACK TOUCH-SENSITIVE INTERFACE MODULE

FIELD OF THE INVENTION

The present invention relates to a touch-sensitive interface module for a motor vehicle, in particular allowing haptic feedback to be transmitted to a user, such as a vibration feedback.

BACKGROUND OF THE INVENTION

In the automotive sector, multifunction control modules, which are produced, for example, in the form of a joystick or a rotary button, are increasingly used to control electrical or electronic systems, such as an air-conditioning system, an audio system or a navigation system.

Such modules may be associated with a display screen and allow navigation in pull-down menus which comprise various commands relating to the systems to be controlled.

However, the presence of an increasing number of complex functions brings about a multiplication of these modules. Therefore, in order to increase the ergonomic comfort, the use of an interface module with a touch-sensitive surface, in terms of a control surface or a touch screen, is considered to be an advantageous development.

When a user applies pressure to the touch-sensitive surface of such a sensor, it is possible to measure the pressure applied and/or to determine the location of the place where the pressure is applied. In this instance, pressure from the user is, for example, associated with the selection of a command.

Furthermore, in order to signal to the user that his command really has been taken into account, in particular when driving at night or in the event of blind operation, it is important for the user to have haptic feedback in order to remain concentrated on the road.

To this end, there are already known haptic feedback control modules comprising actuators, such as electromagnetic actuators, which are connected to the interface module in order to transmit a vibration movement, so that the user perceives haptic feedback informing him that his command really has been taken into account.

These electromagnetic actuators comprise a coil and one or more magnets which can be moved in translation relative to the coil. When the coil is supplied with electrical power, the magnets are caused to move, and this movement is transmitted to the touch-sensitive surface.

A second assembly, called a "voice coil" since it is associated with the loud-speakers, is obtained by assembling the movable coil in a transposed manner relative to one or more relatively fixed magnets.

However, when the movable cores arrive at the end of their travel, they strike stops or the chassis of the actuator. These repeated impacts, in addition to the undesirable noise which they produce, contribute to the wear of the components. They thus reduce the efficiency of the haptic feedback and may in the long term make it necessary to replace all or part of the actuator.

In order to overcome this problem, it is known to use damping elements between the components which are called upon to collide with each other. However, owing to their very function as damping elements, these components absorb the energy which would have been used for the movement. This absorption of energy therefore reduces the overall efficiency of the actuator.

An object of the invention is in particular to improve the efficiency, measured using the acceleration provided at the touch-sensitive surface, whilst preventing impacts between the mechanical components of the actuator.

SUMMARY OF THE INVENTION

To this end, the invention relates to a touch-sensitive interface module with haptic feedback comprising a touch-sensitive surface which is capable of detecting pressure from a user and at least one actuator which is connected to the touch-sensitive surface, which is capable of generating haptic feedback in accordance with the pressure detected and which comprises:
  a chassis,
  a movable core which cooperates with the chassis, and which is intended to be driven in terms of movement between end positions in order to generate the haptic feedback, and
  electromagnetic actuation means in order to movingly drive the movable core;
and whose actuator further comprises a first and a second pretensioned resilient means, arranged at one side and the other of the movable core, respectively.

The actuator of such an interface module with haptic feedback combines an electromagnetic device and a mechanical device which are coupled.

Thus, there is produced a touch-sensitive interface module with haptic feedback which has a small spatial requirement and whose haptic actuator has no components which collide with each other, without the efficiency thereby being reduced for all that. For the same volume and the same electrical energy supplied, the haptic sensation is greater.

The touch-sensitive interface module with haptic feedback may further comprise one or more features, taken separately or in combination, from the features below.

The first and second resilient means define a floating rest position of the movable core.

The first and second resilient means comprise helical springs.

The first and second resilient means comprise leaf springs.

The first and second resilient means comprise a resilient material such as urethane, an expanded polymer, an ionically cross-linked polymer or rubber.

The first and second resilient means are aligned with respect to the axis which is parallel with the movement direction of the movable core and which extends via the centre of gravity thereof.

The first and second resilient means are pretensioned in terms of compression.

The movable core comprises at least one magnet and the chassis comprises a coil.

The chassis is fixedly joined to the touch-sensitive surface, the first resilient means is connected to the touch-sensitive surface, on the one hand, and to the movable core, on the other hand, and the second resilient means is connected to the chassis, on the one hand, and to the movable core, on the other hand.

The chassis comprises a cover which is fixedly joined to the touch-sensitive surface, and the first resilient means of the actuator is connected to the cover, on the one hand, and to the movable core, on the other hand, and the second resilient means is connected to the chassis, on the one hand, and to the movable core, on the other hand.

The interface module comprises a frame which is fixedly joined to the chassis and which receives the touch-sensitive surface and the actuator, and the first resilient means of the actuator is connected to the touch-sensitive surface, on the one hand, and to the movable core, on the other hand, and the second resilient means is connected to the chassis, on the one hand, and to the movable core, on the other hand.

The first and second resilient means have different rigidities.

The movable core and the chassis comprise means for guiding by means of form-fitting.

The interface module comprises a plurality of actuators and a common controller for their actuation.

BRIEF DESCRIPTION OF THE DRAWINGS

Other features and advantages of the invention will be appreciated from the following description, given by way of example and in a non-limiting manner, with regard to the appended drawings, in which.

In all the Figures, elements which are the same have the same reference numerals.

DETAILED DESCRIPTION

The invention relates to a touch-sensitive interface module 1 with haptic feedback, for example, for a motor vehicle control panel, or for a central console of a motor vehicle, which allows electrical or electronic systems of the vehicle to be controlled and which is able to transmit haptic feedback to a user who has, for example, modified or selected a command, in order to assure the user that the modified or selected command has been taken into account.

The interface module comprises a touch-sensitive surface 3, for example, which uses capacitive technology, or resistors which are sensitive to pressure (Force Sensing Resistor, FSR) in order to detect the location of the finger of a user on a position of the surface thereof corresponding to a command. It is also possible to use a touch screen which is transparent and superimposed on a display screen, operating, for example, by means of detection of surface waves.

Figure 1:
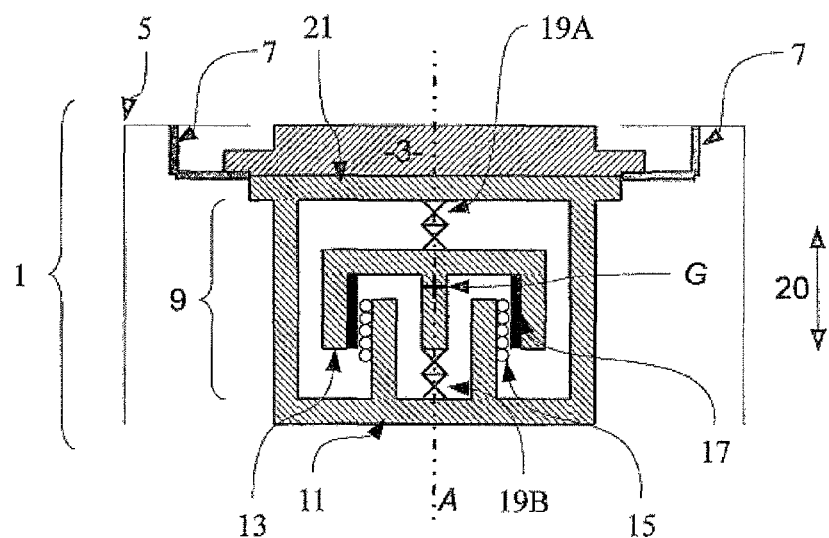
FIG. 1 is a schematic cross-section of an interface module according to an embodiment which is referred to as "suspended" and in which the actuator forms an isolated unit, fixed to the touch-sensitive surface to be moved.

In FIG. 1, the touch-sensitive surface is connected in a floating manner to the frame 5 of the touch-sensitive interface module 1. The connection between the surface 3 and the frame 5 is carried out by means of a connection 7 of the semi-rigid membrane type, or any other fixing means which allows limited movements, in particular in terms of vibration, along the axis perpendicular to the touch-sensitive surface 3.

The touch-sensitive surface 3 is connected to an actuator 9 which brings about the haptic feedback during the detection of the pressure of the user. This actuator 9 comprises, on the one hand, a chassis 11, which is fixedly joined to the touch-sensitive surface 3, and a movable core 13 which co-operates with the chassis.

The movable core 13, which is accommodated in the chassis 11 is caused to move between end positions by electromagnetic actuation means 15, 17. During this back-and-forth movement, the core alternates between acceleration and deceleration phases, during which the movable core 13 brings about the movement of the touch-sensitive surface 3, and therefore the haptic feedback.

Furthermore, the actuator 9 comprises a first and a second pretensioned resilient means 19A and 19B, at one side and the other of the movable core 13. The movable core 13 is engaged between the first pretensioned resilient means 19A and second pretensioned resilient means 19B, one 19A being located between the touch-sensitive surface 3 and the movable core 13, the other 19B being located between the movable core 13 and the chassis 11.

In this manner, the resilient means 19A and 19B assist the electromagnetic actuation means 13, 17 in that they store a portion of the kinetic energy communicated to the movable core during its deceleration phases in the form of resilient potential energy, in order to then recover it during the acceleration phases.

The pretensioned resilient means 19A and 19B may define, in the absence of a power supply to the coil, a rest position of the movable core 13, in which position the forces applied by each of the resilient means 19A and 19B compensate for each other. The arrangement of the resilient means 19A and 19B ensures that this rest position is floating: the movable core 13 is not in contact with any component of the actuator other than the resilient means 19A and 19B.

The resilient means 19A and 19B may be helical springs or leaf springs.

It is also possible to use a resilient material, such as an expanded polymer of the urethane type, an ionomer (ionically cross-linked polymer) or rubber.

Finally, one of the resilient means 19A or 19B may be composed of a combination of the embodiments set out above.

One embodiment places the resilient means 19A and 19B in an aligned manner with respect to the axis A-A, which is parallel with the movement direction of the movable core 13, indicated by the arrow 20, and which extends via the centre of gravity G of the movable core 13. In this manner, they generate no torque on the movable core 13. This has the effect of preventing the rotation of the movable core 13, which may imply that it is blocked or is striking other mechanical components.

In particular, according to a variant which is not illustrated, it is possible to make provision for one of the resilient means 19A or 19B to be composed of a plurality of resilient elements and for them to be distributed in a uniform manner about the axis A-A so that the total of the torques that they apply to the movable core is zero.

The present embodiment describes the use of resilient means 19A and 19B which are pretensioned in terms of compression, but the use of resilient means 19A and 19B which are pretensioned in terms of extension is also possible.

In order to produce the electromagnetic actuation means 15, 17, the chassis 11 carries a coil 15 which may provide a magnetic field and the movable core carries at least one magnet 17, preferably a plurality of magnets, which are arranged as close as possible to the coil and so as to be free in terms of translation along the axis A-A.

It is also possible to carry out transposed assembly, the coil 15 then being fixedly joined to the movable core 13 and the magnet(s) 17 being fixedly joined to the chassis 11.

FIG. 1 illustrates an embodiment of an actuator referred to as being "suspended". The term "suspended" is intended to refer to the fact that the actuator 9 is not connected to the frame 5 of the touch-sensitive interface module 1, and the chassis 11 is fixedly joined to the touch-sensitive surface 3.

In suspended assembly, the movable core 13 is what causes the touch-sensitive surface 3 to move in order to generate the haptic feedback.

The chassis 11 has a cover 21 which acts as a support for fixing to the touch-sensitive surface 3. The chassis 11 forms a receptacle which receives the remainder of the actuator 9. The first resilient means 19A of the actuator is connected to the cover 21 of the chassis 11, on the one hand, and to the movable core 13, on the other hand, and the second resilient means 19B is connected to the chassis 11, on the one hand, and to the movable core 13, on the other hand.

The actuator 9 thus forms a well-defined functional unit which can be readily assembled on and disassembled from the interface module 1. This is because the functional unit is simply screwed or clip-fitted to the touch-sensitive surface 3 and may therefore be rapidly interchanged, without the resilient means 19A and 19B having to be manipulated.

Figure 2:
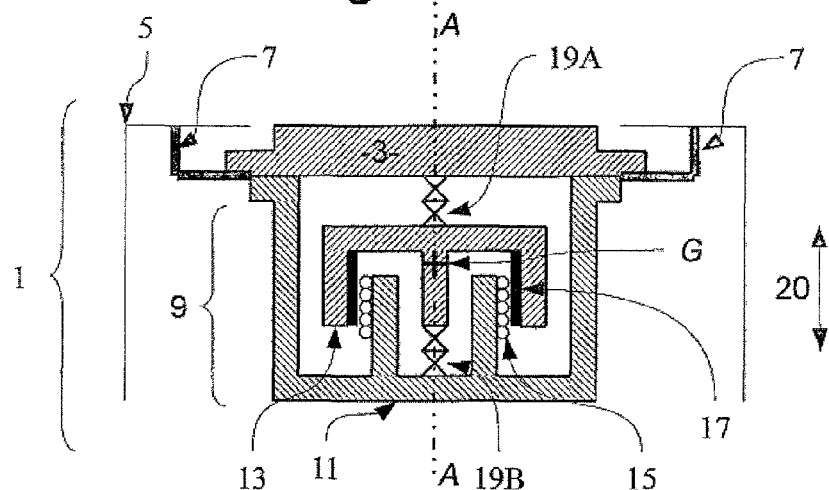
FIG. 2 is a schematic cross-section of a variant of the suspended embodiment, in which a resilient means of the actuator is in direct contact with the touch-sensitive surface to be moved.

However, it may be envisaged to produce a variant of this assembly, shown in FIG. 2, wherein the chassis 11, which does not have a cover 21, is open over the upper portion thereof, and wherein the first resilient means 19A of the actuator 9 is connected directly to the touch-sensitive surface 3, on the one hand, and to the movable core 13, on the other hand, and the second resilient means 19B is connected to the chassis 11, on the one hand, and to the movable core 13, on the other hand.

According to one embodiment, there is provision for the chassis 11 and the movable core 13 to comprise means 13, 33 for guiding by means of form-fitting. To this end, the movable core 13 has an "E"-shaped cross-section whose central branch is fitted in a corresponding portion of the chassis 11 having a U-shaped cross-section.

The resilient means 19A and 19B, because their rigidity may be modified, allow various forms of vibrations of the touch-sensitive surface 3 to be produced. It is therefore possible to generate different haptic feedbacks which may serve to signify to the user as many different pieces of information: the selection being taken into account or, in contrast, being rejected, or an incorrect input being detected.

In particular, the resilient means 19A and 19B at one side and the other of the movable core 13 may have a different rigidity so that the movement of the movable core 13 is highly asymmetrical relative to the rest position.

Figure 3:
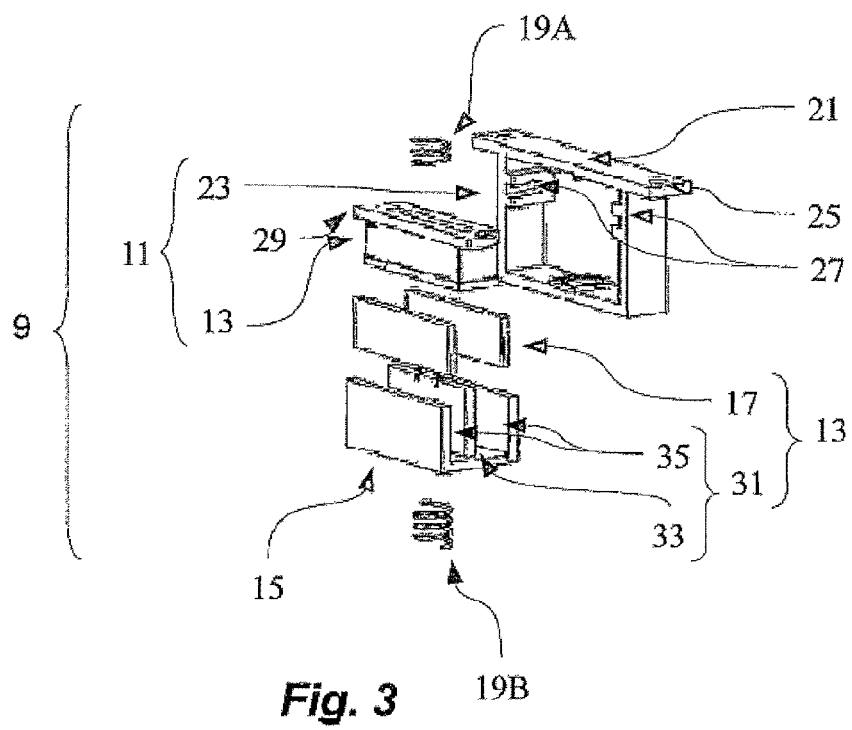
FIG. 3 is an exploded perspective view of another variant of an actuator for an interface module with haptic feedback, according to a suspended embodiment.
Figure 4:
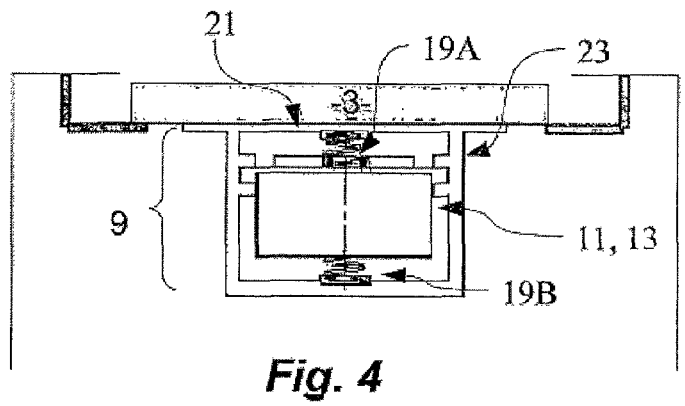
FIG. 4 shows the actuator of FIG. 3 mounted on the touch-sensitive surface to be moved.

FIGS. 3 and 4 illustrate another production variant of a suspended actuator 9.

The chassis 11 is composed of two portions: a coil 15 and a fixed support 23. The fixed support 23 forms a frame and surrounds the coil 15. It also receives the other components of the actuator 9. It has at the upper portion thereof forming a cover 21 two prebores 25 in which there are accommodated retention screws which fix it to the touch-sensitive surface 3. At the inner side thereof, it has two snap-fitting locations 27 which are intended to be in engagement with two complementary tongues 29 at the sides of the coil 15 in order to fix it in position, as seen in FIG. 4.

The movable core 13 comprises two magnets 17 which are retained opposite the sides of the coil 15 and a magnet support 31 to which the magnets 17 are fixed by means of clip-fitting or adhesive bonding. The magnet support 31 has an E-shaped cross-section, whose central branch 33 is fitted in the coil 15, protruding slightly at each end of the coil 15. The two lateral branches 35 carry the magnets 17.

The resilient means 19A and 19B comprise two helical springs pressing on the central branch 33 of the E-shaped cross-section of the magnet support 31. The helical springs 19A and 19B are kept in a compressed state by the support 23 of the chassis 11 which receives the components described above in a housing whose height is less than the sum of the lengths of the helical springs 19A and 19B in the non-tensioned state, added to the height of the movable core 13.

During assembly, the assembly comprising the coil 15, the movable core 13 and springs 19A and 19B is first assembled separately, then compressed in order to pretension the springs 19A and 19B. Finally, it is inserted into the fixed support 23 by means of one of the lateral openings of the fixed support.

The actuator 9 assembled in this manner is then screwed to the inner or rear surface of the touch-sensitive surface 3, as seen in FIG. 4.

During operation, the coil 15 receives a signal in response to the detection of pressure on the touch-sensitive surface 3. This signal is, for example, either an alternating current or a pulse train.

When the coil 15 is supplied by the current of the signal, it applies an electromagnetic force to the magnets 17. They are caused to move, and carry with them the magnet support 31 with which they form the movable core 13.

The movable core 13 moves away from a rest position in which the forces which the springs 19A and 19B apply to it compensated for each other. In this manner, with respect to the rest position, one of the springs 19A or 19B is compressed, whilst the other is relaxed. The springs 19A and 19B thus apply a first force which is opposed to the movement of the movable core 13 and a second reaction force to the fixed support 23, which is transmitted to the touch-sensitive surface 3 and generates the haptic feedback.

Consequently, the movable core 13 oscillates between end positions. A smaller portion of the energy applied electrically therefore serves to compensate for the energy imparted to the tactile surface 3 in order to move it and to compensate for the losses owing to friction, which the assembly tends to reduce to the maximum extent.

By allowing the movable core 13 to oscillate between end positions, the two springs 19A and 19B prevent the loss of energy that impacts, even damped, of the movable core 13 against the other components represent. The invention therefore allows a compact actuator 9 to be produced which is simple to assemble and mount on a touch-sensitive surface 3 and which provides, with equal volume and consumption, a greater haptic sensation.

Figure 5:
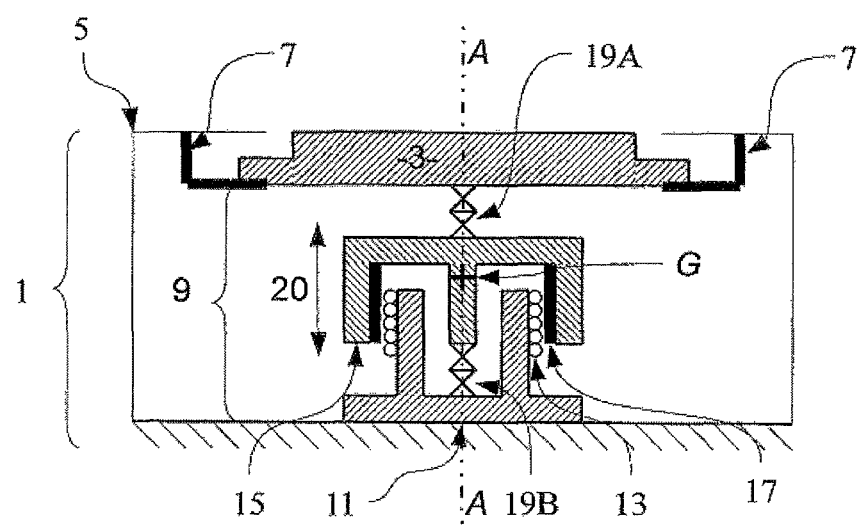
FIG. 5 is a schematic cross-section of an embodiment of an alternative touch-sensitive interface module, which is referred to as "connected" and in which the actuator is in contact with the touch-sensitive surface and the frame of the module.

According to a second embodiment, illustrated in FIG. 5, there is provision for the use of an actuator 9 which is referred to as being "connected". The term "connected" is intended to be understood to refer to the fact that the actuator is connected to the frame 5 of the touch-sensitive interface module 1, via the chassis 11. The first resilient means 19A of the actuator is connected to the touch-sensitive surface 3, on the one hand, and the movable core 13, on the other hand, and the second resilient means 19B is connected to the chassis 11, on the one hand, and to the movable core 13, on the other hand.

In this embodiment, the movable core applies via the second resilient means and the chassis a reaction to the frame. The operation thereof is similar to the embodiment described above.

Figure 6:
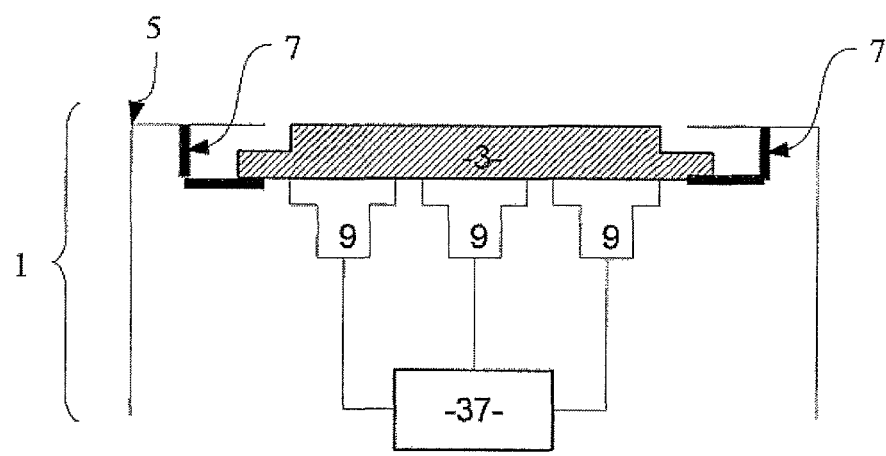
FIG. 6 shows a touch-sensitive interface module provided with a plurality of actuators which are connected to a common controller.

Furthermore, with reference to FIG. 6, it is possible to provide a plurality of actuators 9 for an interface module 1 which are all connected to a single common controller 37 which allows them to be actuated in accordance with patterns which involve one or more of the actuators 9, in order to generate a range of haptic feedbacks which is even more varied.

For example, two actuators 9 located at two opposing ends of the touch-sensitive surface 3 may have their movable cores 13 driven so as to oscillate between their end positions in mutual phase opposition. This leads to a balancing of the touch-sensitive surface 3 which will be perceived differently from a vibration of the touch-sensitive surface 3 obtained by oscillating the two movable cores 13 in phase. It is thus possible to encode, for example, acceptance or rejection of the command selected by different vibration patterns.

The invention claimed is:

1. A touch-sensitive interface module with haptic feedback comprising a touch-sensitive surface which is capable of detecting pressure from a user and at least one actuator which is connected to the touch-sensitive surface, which is capable of generating haptic feedback in accordance with the pressure detected and which comprises:
   a chassis;
   a movable core which cooperates with the chassis to be driven in terms of movement between end positions in order to generate the haptic feedback;
   a magnet;
   a coil,
      wherein, together, the magnet and the coil movingly drive the movable core,
      wherein the magnet is coupled directly to an interior portion of the movable core, and the coil is coupled directly to the chassis; and
   a first and a second pretensioned resilient material arranged at one side and the other of the movable core, respectively.

2. The interface module as claimed in claim 1, wherein the first and second pretensioned resilient material defines a floating rest position of the movable core.

3. The interface module as claimed in claim 1, wherein the first and second pretensioned resilient material comprises helical springs.

4. The interface module as claimed in claim 1, wherein the first and second pretensioned resilient material comprises leaf springs.

5. The interface module as claimed in claim 1, wherein the first and second pretensioned resilient material is selected from the group consisting of: urethane, an expanded polymer, an ionically cross-linked polymer and rubber.

6. The interface module as claimed in claim 1, wherein the first and second pretensioned resilient material is aligned with respect to the axis which is parallel with the movement direction of the movable core and which extends via the centre of gravity thereof.

7. The interface module as claimed in claim 1, wherein the first and second pretensioned resilient material is pretensioned in terms of compression.

8. The interface module as claimed in claim 1, wherein the chassis is fixedly joined to the touch-sensitive surface, wherein the first pretensioned resilient material is connected to the touch-sensitive surface, on the one hand, and to the movable core, on the other hand, and the second pretensioned resilient material is connected to the chassis, on the one hand, and to the movable core, on the other hand.

9. The interface module as claimed in claim 1, wherein the chassis comprises a cover which is fixedly joined to the touch-sensitive surface, and wherein the first pretensioned resilient material of the actuator is connected to the cover, on the one hand, and to the movable core, on the other hand, and the second pretensioned resilient material is connected to the chassis, on the one hand, and to the movable core, on the other hand.

10. The interface module as claimed in claim 1, further comprising a frame which is fixedly joined to the chassis and which receives the touch-sensitive surface and the actuator, and wherein the first pretensioned resilient material of the actuator is connected to the touch-sensitive surface and to the movable core, and the second pretensioned resilient material is connected to the chassis, on the one hand, and to the movable core, on the other hand.

11. The interface module as claimed in claim 1, wherein the first and second pretensioned resilient material has different rigidities.

12. The interface module as claimed in claim 1, wherein the movable core and the chassis comprise means for guiding by means of form-fitting.

13. The interface module as claimed in claim 1, further comprising a plurality of actuators and a common controller for the actuation thereof.

* * * * *